United States Patent [19]

Rosenberg

[11] Patent Number: 4,630,789
[45] Date of Patent: Dec. 23, 1986

[54] DIELECTRIC ISOLATED FUEL AND HYDRAULIC TUBES

[75] Inventor: Jerome C. Rosenberg, Bellevue, Wash.

[73] Assignee: The Boeing Company, Seattle, Wash.

[21] Appl. No.: 535,300

[22] Filed: Sep. 23, 1983

[51] Int. Cl.$^4$ .............................................. B64D 37/32
[52] U.S. Cl. ................................ 244/135 R; 244/1 A; 174/2; 361/215; 361/218
[58] Field of Search ............... 244/1 A, 135 R, 135 B, 244/129.2; 285/47; 138/145, 149, DIG. 3; 174/2, 32, 127, 110 N, 110 FC; 361/212, 215, 216, 218

[56] References Cited

U.S. PATENT DOCUMENTS 3,278,673  10/1966  Gore ..................................... 174/127
3,389,111  6/1968   McKeown ........................... 174/127
3,473,087  10/1969  Slade .................................... 361/215

FOREIGN PATENT DOCUMENTS 2048424  2/1973  Fed. Rep. of Germany .... 244/135 R

*Primary Examiner*—Galen L. Barefoot
*Assistant Examiner*—Rodney Corl
*Attorney, Agent, or Firm*—Bruce A. Kaser; Delbert J. Barnard

[57] ABSTRACT

A plurality of metal conduits for fuel for hydraulic fluids extend through an aircraft fuel tank made of nonmetallic materials such as carbon-epoxy. The conduits are attached to wall portions of the tank at spaced apart locations. The conduits are spaced apart from each other and are each spaced away from such wall portion of the tank. A dielectric insulator such as teflon or polyimide is provided on each conduit.

5 Claims, 2 Drawing Figures

DIELECTRIC ISOLATED FUEL AND HYDRAULIC TUBES

DESCRIPTION

1. Technical Field

This invention relates to aircraft fuel tanks and more particularly to a system for eliminating electrical arcing between wall portions of fuel tanks, constructed from non-metallic materials, and metal conduits for fuel or hydraulic fluids which extend through the fuel tank.

2. Background Information

A lightning strike or any other electrical discharge to an aircraft tank made of non-metallic material such as carbon-epoxy can cause arcing between the tank structure and internal metal fuel and/or hydraulic lines. Electrical arcing in the fuel could cause an explosion.

A possible method of tube installation in a non-metallic tank is to electrically ground each tube to the tank wall structure at regular intervals and to maintain a spacing between each conduit and any adjoining conduit and between each conduit and the nearest wall portion of the tank, or other tank structure. The reason for the grounding would be to limit the maximum induced voltage. The spacing would be expected to provide enough of a dielectric to prevent arcing. The dielectric in this case would be solely the dielectric strength of the fuel-air mixture in the tanks surrounding the conduit.

A problem of such a method of protection against explosions caused by electrical arcing is that it is extremely difficult to always achieve the necessary spacing of the conduits to each other and/or to the tank structure. This is due to the manner in which the tanks are constructed, to the manner in which the conduits are installed, and to mounting requirements. Also, there is some question if the necessary dielectric property can be maintained in the fuel-air mixture in the event of fuel contamination which occurs frequently.

The principal object of the present invention is to make the protection against arcing completely independent of the dielectric strength of the fuel-air mixture in the tank.

DISCLOSURE OF THE INVENTION

In accordance with the present invention, each metal conduit is spaced from each adjacent metal conduit and from the near portions of the tank wall, and each metal conduit is electrically grounded to a wall portion of the tank. In addition, each metal conduit is provided with a dielectric insulator of a thickness sufficient to prevent arcing between the conduit and an adjacent structure, such as a wall portion of the tank or another conduit, in response to the presence of an induced voltage produced by a lightning strike on the tank.

In preferred form, the dielectric insulator is a coating of a material such as Teflon brand material or polyimide.

The use of a dielectric insulator on the conduit makes it possible to locate the conduits relatively next to each other and/or the fuel tank structure without concern that a lightning strike will cause arcing. Use of the dielectric insulator coating results in a removal of the pipe spacing requirements, as arcing prevention is no longer dependent on the dielectric strength of the fuel-air mixture between parts, resulting in a substantial reduction of the installation problems which would be required if the former conduit spacing requirements still had to be met.

BRIEF DESCRIPTION OF THE DRAWINGS

Like reference numerals are used to designate like parts throughout the several views, and.

BEST MODE FOR CARRYING OUT THE INVENTION

Figure 1:
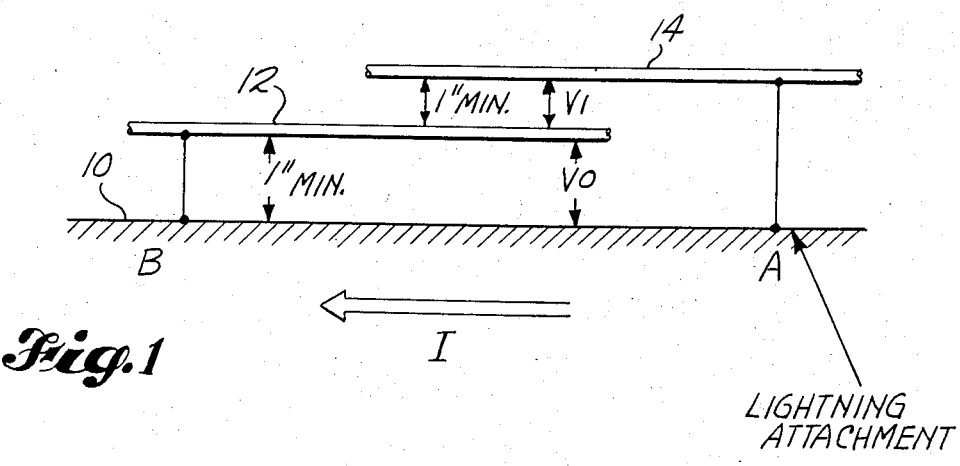
FIG. 1 is a diagramatic view of a pair of metal conduits within a fuel tank constructed from a non-metallic material, shown spaced apart from each other and from an adjoining wall of the tank, and shown to be electrically grounded to the tank at spaced apart locations.
Figure 2:
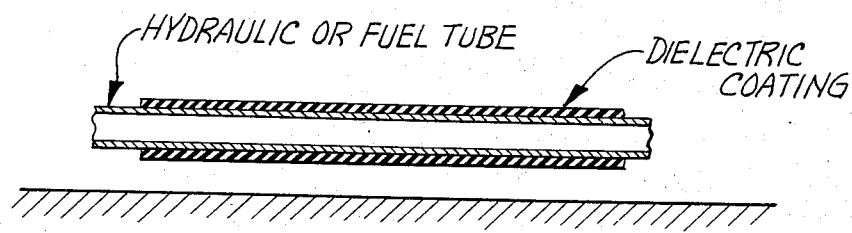
FIG. 2 is an enlarged scale view of a metal conduit for a fuel or a hydraulic fluid, shown located closely adjacent to a wall portion of the tank, and shown to include a dielectric coating.

Referring to FIG. 1, the reference numeral 10 is used to designate a wall portion of a non-metallic fuel tank. The material used may, for example, be a carbon-epoxy type composite material. The problem to be addressed by the present invention is shown in this view. Specifically, the view shows a considered arrangement of spacing a metal conduit 12 a minimum distance of about one inch from the tank wall 10. It also shows spacing the conduit 12 a minimum distance of about one inch from an adjacent conduit 14. Each conduit 12, 14 is electrically grounded to the tank wall 10. In this diagram, conduit 14 is electrically grounded to wall 10 at point A. Conduit 12 is electrically grounded to wall 10 at point B.

FIG. 1 shows how a lightning strike can cause an induced voltage problem. A lightning attachment adjacent point A will cause a large voltage drop between point A and point B, due to the high electrical resistivity of the non-metallic material. The resistivity of a carbon-epoxy material, for example, is much larger than the electrical resistivity of aluminum, a common metal used in the construction of aircraft fuel tanks.

The lightning attachment causes a voltage potential VO to be developed between the pipe 12 and the tank wall 10. A second voltage potential V1 is developed between conduit 12 and the second conduit 14. If either of these voltages exceeds the dielectric of the fuel-air mixture within the tank, arcing will occur and an explosion might result.

In accordance with the present invention, each conduit 12, 14 is provided with a dielectric insulator. By way of example, the dielectric insulator may be a coating of Teflon brand material (e.g. 10 mils in thickness) or a coating of Polyimide. The thickness of the coating is selected to be thick enough to provide full voltage protection. The dielectric insulator coating on the conduits 12, 14 makes the protection against arcing completely independent of the dielectric strength of the fuel-air mixture in the tank surrounding the conduits 12, 14.

When coated with a dielectric insulator in accordance with the present invention, the conduits 12, 14 can be placed closely adjacent to each other and to the tank structure, without concern that a lightning strike will cause arcing. The removal of the spacing requirements between the conduits and between each conduit and the adjoining wall structure of the tank greatly simplifies installation of the conduits 12, 14 within the fuel tank.

The installation which is illustrated and described is provided for the purpose of better explaining the invention and providing an embodiment of the invention. However, such embodiment is not to be used for the purpose of directly defining or limiting the invention. Rather, the scope of the invention is to be determined solely by the appended claims interpreted in accordance with established doctrines of patent claim interpretation.

What is claimed is:

1. In an aircraft,
    a fuel tank comprising walls of a non-metallic composite material such as carbon-epoxy or the like,
    a metal conduit for fuel or a hydraulic liquid extending through said tank, and spaced from the tank and normally being surrounded by a fuel-air mixture within the tank;
    means for electrically grounding said metal conduit to said tank; and
    a dielectric insulator on said metal conduit of a thickness sufficient to prevent arcing between the tank and the conduit which might otherwise occur in response to a lightening strike on the tank.

2. The apparatus of claim 1, wherein the dielectric insulator is a coating of a Teflon brand material.

3. Apparatus according to claim 2, wherein the teflon coating is approximately ten mils in thickness.

4. Apparatus according to claim 1, wherein the dielectric insulator is a coating of polyimide.

5. Apparatus according to claim 1, comprising a second metal conduit in the tank that is spaced from the first metal conduit and from said tank, and means electrically grounding the second metal conduit to the tank at a location spaced from the point of grounding attachment of the first metal conduit to the tank, and a dielectric insulator on the second metal conduit, of a thickness to prevent arcing between the two metal conduits.

* * * * *